US012798298B2

(12) United States Patent
Perrin et al.

(10) Patent No.: US 12,798,298 B2
(45) Date of Patent: Nov. 17, 2026

(54) AGRICULTURAL VEHICLE TIRE COMPRISING A SINGLE-LAYER CARCASS REINFORCEMENT

(71) Applicant: COMPAGNIE GENERALE DES ETABLISSEMENTS MICHELIN, Clermont-Ferrand (FR)

(72) Inventors: Frédéric Perrin, Clermont-Ferrand Cedex (FR); Florian Lachal, Clermont-Ferrand Cedex (FR); Richard Cornille, Clermont-Ferrand Cedex (FR); Sabrina Rih, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 444 days.

(21) Appl. No.: 17/795,772

(22) PCT Filed: Feb. 2, 2021

(86) PCT No.: PCT/FR2021/050188

§ 371 (c)(1),
(2) Date: Jul. 27, 2022

(87) PCT Pub. No.: WO2021/156565

PCT Pub. Date: Aug. 12, 2021

(65) Prior Publication Data

US 2023/0069952 A1 Mar. 9, 2023

(30) Foreign Application Priority Data

Feb. 6, 2020 (FR) ....................................... 2001176

(51) Int. Cl.

*B60C 9/02* (2006.01)
*B60C 9/18* (2006.01)

(Continued)

(52) U.S. Cl.

CPC .......... *B60C 9/2006* (2013.01); *B60C 9/0238* (2013.01); *B60C 11/033* (2013.01);

(Continued)

(58) Field of Classification Search

CPC ........... B60C 11/033; B60C 2009/0475; B60C 9/005; B60C 9/0238; B60C 2009/2051; B60C 2009/2058

See application file for complete search history.

(56) References Cited

U.S. PATENT DOCUMENTS

| | | | |
|---|---|---|---|
| 2003/0019557 | A1 | 1/2003 | Prakash |
| 2006/0124215 | A1 | 6/2006 | Vu |

(Continued)

FOREIGN PATENT DOCUMENTS

| | | |
|---|---|---|
| EP | 1 109 682 | 6/2001 |
| EP | 2 826 641 | 1/2015 |

(Continued)

*Primary Examiner* — Justin R Fischer
*Assistant Examiner* — Nicholas J Weiler
(74) *Attorney, Agent, or Firm* — COZEN O'CONNOR

(57) ABSTRACT

A tire for an agricultural vehicle (1), and in particular the carcass reinforcement (4) thereof, for a tire running at low pressure on loose ground, is to reduce the compaction of the ground and to increase the traction capability by reducing the structural stiffness of the tire. According to the invention, the carcass reinforcement (4) is made up of a single carcass layer (41) having a mean thickness E at most equal to 2 mm and a breaking strength Fr, expressed in daN/cm, that satisfies the relationship:

$$Fr>=Fs=(Cs*P\max*10^{-3})*((R^2-((R+Rj)/2)^2)/2)/Rj,$$

with

Fs: reference threshold strength (in daN/cm)
Cs: safety factor at least equal to 1,
Pmax: recommended maximum inflation pressure (in kPa), (Continued)

R=D/2: outside radius of the tire (in mm),
Rj=Dj/2: nominal radius of the rim (in mm).

14 Claims, 5 Drawing Sheets

(51) Int. Cl.

| | |
|---|---|
| ***B60C 9/20*** | (2006.01) |
| ***B60C 11/03*** | (2006.01) |
| ***B60C 11/11*** | (2006.01) |
| *B60C 9/04* | (2006.01) |

(52) U.S. Cl.
CPC ....... *B60C 11/11* (2013.01); *B60C 2009/0246* (2013.01); *B60C 2009/045* (2013.01); *B60C 2009/0475* (2013.01); *B60C 2009/2051* (2013.01); *B60C 2009/2096* (2013.01); *B60C 2200/08* (2013.01)

(56) References Cited

U.S. PATENT DOCUMENTS

| | | | | |
|---|---|---|---|---|
| 2006/0237110 | A1* | 10/2006 | Barguet | D07B 1/0633 57/210 |
| 2018/0272802 | A1* | 9/2018 | Ito | B60C 9/0238 |
| 2018/0370292 | A1* | 12/2018 | Spinnler | B60C 11/0311 |
| 2020/0164689 | A1* | 5/2020 | Hottebart | B60C 9/0064 |
| 2020/0316999 | A1* | 10/2020 | Rih | B60C 9/2204 |
| 2021/0053398 | A1* | 2/2021 | Duchemin | B60C 9/0042 |
| 2022/0016932 | A1* | 1/2022 | Kobayashi | B60C 9/28 |
| 2022/0169078 | A1* | 6/2022 | Agresti | D07B 1/0613 |

FOREIGN PATENT DOCUMENTS

| | | | | |
|---|---|---|---|---|
| FR | 2 367 626 | | 5/1978 | |
| WO | WO-2019122620 | A1 * | 6/2019 | B60C 9/005 |
| WO | WO-2019180352 | A1 * | 9/2019 | B60C 3/00 |

* cited by examiner

AGRICULTURAL VEHICLE TIRE COMPRISING A SINGLE-LAYER CARCASS REINFORCEMENT

RELATED APPLICATIONS

This is a U.S. National Phase Application under 35 USC 371 of International Application PCT/FR2021/050188 filed on Feb. 2, 2021.

This application claims the priority of French application no. FR 2001176 filed Feb. 6, 2020, the entire content of all of which is hereby incorporated by reference.

FIELD OF THE INVENTION

The present invention relates to a tire for an agricultural vehicle, such as an agricultural tractor or an agri-industrial vehicle, and relates more particularly to the carcass reinforcement thereof.

BACKGROUND OF THE INVENTION

The dimensional specifications (section width, overall diameter, diameter and width of the mounting rim) and the use conditions (load, speed, pressure) of a tire for an agricultural vehicle are defined in standards, for example the standard of the "European Tire and Rim Technical Organisation" or ETRTO in its "Standards Manual-2018", in the section devoted to "Agricultural equipment tires". By way of example, a radial tire for a driven wheel of an agricultural tractor is intended to be mounted on a rim of which the diameter is generally between 16 inches and 46 inches, or even 54 inches, and to equip an agricultural tractor having a power of between 50 CV and more than 250 CV (up to 550 CV) and capable of running at up to 65 km/h. For this type of tire, the minimum inflation pressure in use, corresponding to the indicated loading capacity, is usually at most equal to 400 kPa, but may drop as low as 240 kPa for an Improved Flexion (IF) tire, or even 160 kPa for a Very high Flexion (VF) tire.

A tire for an agricultural vehicle is intended to run over various types of ground such as the more or less compact soil of the fields, unmade tracks providing access to the fields, and the tarmacked surfaces of roads. Bearing in mind the diversity of use, in the field and on the road, a tire for an agricultural vehicle needs to offer a performance compromise between traction in the field on loose ground, resistance to chunking, resistance to wear on the road, resistance to forward travel, and vibrational comfort on the road, this list not being exhaustive.

An ongoing concern of manufacturers of tires for agricultural vehicles is, with regard to the use of the tire in the field, to improve the traction on loose ground by limiting as far as possible the compaction of the soil by the tire, which is liable to hamper crop growth.

This is why, in the field of agriculture, low-pressure and therefore high-flexion tires have been developed. The ETRTO standard thus makes a distinction between IF (Improved Flexion) tires, which have a minimum recommended inflation pressure generally equal to 240 kPa, and VF (Very high Flexion) tires, which have a minimum recommended inflation pressure generally equal to 160 kPa. According to that standard, compared with a standard tire, an IF tire has a 20% higher load-bearing capability, and an IF tire has a 40% higher load-bearing capability, for an inflation pressure equal to 160 kPa.

It is known that the increase in traction on loose ground and the reduction in compaction of the soil are mainly controlled by the pressure in the contact patch in which the tire is in contact with the ground, the pressure in the contact patch itself being controlled largely, but not only, by the inflation pressure.

This is because the inflation pressure confers on the tire a tire stiffness which is in addition to its structural stiffness. Thus, the overall stiffness of the tire results from the combination of a tire stiffness and structural stiffness. Consequently, during use at low pressure, when the tire stiffness becomes low, the structural stiffness of the tire makes a significant contribution to the pressure in the contact patch.

Consequently, to reduce the pressure in the contact patch of a tire at low pressure, it is necessary to reduce the structural stiffness of the tire, and in particular all the bending stiffnesses allowing the flattening thereof, both in the circumferential direction, tangential to the circumference of the tire, and in the axial direction, parallel to the axis of rotation of the tire.

From a structural standpoint, like any tire, a tire for an agricultural vehicle comprises a tread which is intended to come into contact with the ground via a tread surface, corresponding to its surface that comes into contact with firm ground, and the two axial ends of which are connected via two sidewalls to two beads that provide the mechanical connection between the tire and the rim on which it is intended to be mounted.

In the following text, the circumferential (or longitudinal), axial (or transverse) and radial directions denote a direction tangential to the tread surface and oriented in the direction of rotation of the tire, a direction parallel to the axis of rotation of the tire, and a direction perpendicular to the axis of rotation of the tire, respectively. A radial (or meridian) plane is defined by a radial direction and the axial direction and contains the axis of rotation of the tire. A circumferential plane is defined by a radial direction and a circumferential direction and is therefore perpendicular to the axis of rotation of the tire. The circumferential plane that passes through the middle of the tread is known as the equatorial (or median) plane.

The tread of a tire for an agricultural vehicle comprises raised elements, known as tread pattern elements, which extend radially outward from a bearing surface as far as the tread surface and are separated from one another by voids.

The tread may be defined geometrically, in the axial direction, by an axial width L and, in a radial direction, by a radial height H. The axial width L is the distance measured between the two axial end points of the tread, which come into contact with firm ground, when the tire, inflated to its nominal pressure Pn, is squashed under its nominal load Zn, these nominal values being recommended service values that are defined, for example, by the ETRTO standard. The axial width L may be defined in percent by the tire nominal section width B or "design section width" defined in the ETRTO standard. The radial height H of the tread, measured in a radial direction, is the maximum height of the tread pattern elements, or, in an equivalent manner, the maximum depth of the voids that separate the tread pattern elements. The radial height H of the tread is at least equal to 20 mm, often at least equal to 50 mm and usually at least equal to 60 mm.

The proportion of voids in the tread is usually quantified by an overall volumetric void ratio TEV, defined as the ratio between the volume VC of voids and the total volume V of the tread assumed to be free of voids, corresponding to the geometric volume delimited by the tread and the bearing surface, parallel to the tread surface and tangential to the bottoms of the deepest voids. The radial distance between the tread and the bearing surface therefore defines the radial height H of the tread. Since the tread surface varies depending on the degree of wearing of the tread, the overall volumetric void ratio TEV will generally, although not necessarily, vary with the degree of wear. Thus, the overall volumetric void ratio TEV may be defined for when the tire is in a new state or is in a given state of wear. For example, a tire for a driven wheel of an agricultural tractor when in the new state has an overall volumetric void ratio TEV that is at least equal to 30%, often at least equal to 50% and usually at least equal to 60%. In the following text, the expression "overall volumetric void ratio TEV" implicitly means "overall volumetric void ratio TEV when the tire is in a new state".

The tread pattern elements of a tread for an agricultural vehicle are usually, although not necessarily, in the form of lugs. A lug generally has an elongate shape that is parallelepipedal overall, is continuous or discontinuous, is made up of at least one rectilinear or curvilinear portion, and extends axially from a median zone of the tread as far as the axial ends or shoulders thereof. A lug is separated from the adjacent lugs by voids or furrows. The lugs are distributed circumferentially with a spacing that is constant or variable and are generally disposed on either side of the equatorial plane of the tire so as to form a V-shaped pattern, also known as a chevron pattern, the tip of the V-shaped pattern being intended to be the first part to enter the contact patch in which contact is made with the ground. The lugs generally exhibit symmetry with respect to the equatorial plane of the tire, usually with a circumferential offset between the two rows of lugs, obtained by one half of the tread being rotated about the axis of the tire with respect to the other half of the tread.

A radial tire for an agricultural vehicle further comprises a reinforcement made up of a crown reinforcement radially on the inside of the tread and of a carcass reinforcement radially on the inside of the crown reinforcement.

The crown reinforcement of a radial tire for an agricultural vehicle comprises a superposition of circumferentially extending crown layers, radially on the outside of the carcass reinforcement. Each crown layer is made up of reinforcers that are coated in an elastomer-based compound and are mutually parallel. When the crown layer reinforcers form an angle at most equal to 10° with the circumferential direction, they are referred to as circumferential, or substantially circumferential, and perform a hooping function that limits the radial deformations of the tire. When the crown layer reinforcers form an angle at least equal to 10° and usually at most equal to 30° with the circumferential direction, they are referred to as angled reinforcers, and have a function of reacting the transverse loads, parallel to the axial direction, that are applied to the tire. The crown layer reinforcers may be made up of an assembly of multifilament strands made of polymer materials of textile type, such as a polyester, for example a polyethylene terephthalate (PET), an aliphatic polyamide, for example a nylon, an aromatic polyamide, for example aramid, or rayon, or of an assembly of threads made of metal material, such as steel. By way of non-limiting example, the crown reinforcement of a tire for an agricultural vehicle running at low pressure often comprises between 4 and 6 crown layers with polyester reinforcers.

The carcass reinforcement of a radial tire for an agricultural vehicle comprises at least one carcass layer connecting the two beads to one another. The reinforcers of a carcass layer are substantially mutually parallel and form an angle of between 75° and 105°, preferably between 85° and 95°, with the circumferential direction. A carcass layer comprises reinforcers, usually textile reinforcers, that are coated with an elastomer-based polymer material, usually referred to as coating compound. When the carcass reinforcement comprises several carcass layers, the respective reinforcers of two consecutive, i.e. mutually adjacent, carcass layers are crossed from one carcass layer to the next.

A reduction in the structural stiffness of the tire and, consequently, easier flattening of the crown of the tire has been able to be achieved by limiting the radial height H of the tread and by positioning the voids, in the tread, in the vicinity of the axial ends thereof, these voids acting as hinges during the flattening of the tread. This type of design is conventionally used for a low-pressure tire tread.

A reduction in the structural stiffness of the tire and, consequently, easier flattening of the crown of the tire has also been able to be achieved by reducing the number of crown layers of the crown reinforcement, making it possible to reduce the thickness of the crown reinforcement. To maintain the same breaking strength of the crown reinforcement, the reduction in the number of crown layers has made it necessary to replace the usual textile reinforcers made of PET or nylon with reinforcers with a higher breaking strength, such as reinforcers made of aramid or steel. For example, a crown reinforcement made up of 4 crown layers with PET reinforcers has been able to be replaced with a crown reinforcement of equivalent breaking strength made up of 2 crown layers with reinforcers made of steel.

SUMMARY OF THE INVENTION

The inventors set themselves the objective, for a tire running at low pressure, such as an IF (Improved Flexion) tire or a VF (Very high Flexion) tire, on loose ground, of reducing the compaction of the ground and of increasing the traction capability through a reduction in the structural stiffness of the tire.

This objective has been achieved, according to embodiments of the invention, by a tire for an agricultural vehicle, intended to be mounted on a rim having a nominal diameter Dj and to be inflated to a recommended minimum pressure at most equal to 240 kPa, having an outside diameter D and comprising, radially from the outside to the inside, a tread, a crown reinforcement and a carcass reinforcement:

- the tread comprising tread pattern elements that are separated from one another by voids and having a radial height H at least equal to 20 mm and at most equal to 60 mm, measured between a tread surface and a bearing surface parallel to the tread surface and tangential to the bottoms of the deepest voids,
- the tread, which has an axial width L, comprising at least two axially outer voids, each having a mean line that forms an angle at most equal to 45° with a circumferential direction of the tire, which are positioned on either side of an equatorial plane passing through the middle of the tread and are spaced apart from one another by a mean axial distance L1 at least equal to 0.5*L,
- the tread having an overall volumetric void ratio TEV, defined as the ratio between the volume VC of voids and the total volume V of the tread assumed to be free of voids, comprised between the bearing surface and the tread surface, at least equal to 30% and at most equal to 60%,
- the crown reinforcement comprising at least two crown layers, each comprising metal reinforcers that are coated in an elastomer-based material, are mutually parallel, are crossed from one layer to the next and form an angle at least equal to 10° with the circumferential direction of the tire, the carcass reinforcement comprising at least one carcass layer comprising textile reinforcers that are coated in an elastomer-based material, are mutually parallel and form an angle at least equal to 75° and at most equal to 105° with the circumferential direction of the tire, the carcass reinforcement being made up of a single carcass layer having a mean thickness E at most equal to 2 mm and a breaking strength Fr, expressed in daN/cm, that satisfies the relationship:

$$Fr>=Fs=(Cs*P\max*10^{-3})*(R^2-((R+Rj)/2)^2)/2)/Rj,$$

with

Fs: reference threshold strength (in daN/cm)

Cs: safety factor at least equal to 1,

Pmax: recommended maximum inflation pressure (in kPa),

R=D/2: outside radius of the tire (in mm),

Rj=Dj/2: nominal radius of the rim (in mm).

An embodiment of the invention is essentially characterized by the choice of a carcass reinforcement having a single carcass layer comprising textile reinforcers, having a limited mean thickness and a breaking strength Fr ensuring an expected level of safety. Such a carcass reinforcement, referred to as a single-layer carcass reinforcement, has low structural stiffness, making it possible, for a tire running at low pressure on loose ground, to reduce the compaction of the ground and to increase the traction capability.

Such a carcass reinforcement exhibiting low structural stiffness is all the more effective with regard to compaction and traction when it is combined with a tread that preferably has the features described below. The tread is not too thick, with a limited radial height H at least equal to 20 mm and at most equal to 60 mm. The tread is open, with an overall volumetric void ratio TEV at least equal to 30% and at most equal to 60%. The tread exhibits flattening made easier by the presence of at least two axially outer voids, each having a mean line that forms an angle at most equal to 45° with a circumferential direction of the tire, which are positioned on either side of an equatorial plane passing through the middle of the tread and are spaced apart from one another by a mean axial distance L1 at least equal to 0.5*L, said voids acting as hinges. In other words, the two axially outer voids are substantially longitudinal and axially spaced apart from another, on average, by a distance at least equal to 0.5*L.

Every carcass layer is radial or substantially radial, i.e. comprises textile reinforcers that are coated in an elastomer-based material, are mutually parallel and form an angle at least equal to 75° and at most equal to 105°, and usually an angle at least equal to 85° and at most equal to 95°, with the circumferential direction of the tire.

According to a first essential feature of the invention, the carcass reinforcement is made up of a single carcass layer having a mean thickness E at most equal to 2 mm.

A carcass layer is a composite structure made up of a juxtaposition of mutually parallel reinforcers that are coated in an elastomer-based material, known as coating material. The carcass layer connects the two beads of the tire by being anchored in each bead to a circumferential reinforcing element, usually made up of an assembly of metal threads known as a bead wire. The thickness of the carcass layer varies depending on the zone of the tire, on account of the geometric shaping to which the carcass layer is subjected while the tire is being manufactured. In a given meridian section of the tire, this thickness is at a maximum radially on the inside of the bead wire and at a minimum radially on the inside of the crown reinforcement. It is conventional to measure the thickness of the carcass layer radially on the inside of the bead wire, that is to say the maximum thickness. Moreover, the thickness measured is what is known as a trimmed thickness, corresponding substantially to the diameter of the reinforcers, without taking into account the thicknesses of the coating compound present radially on either side of the reinforcers. Furthermore, this thickness, which is commonly referred to as the thickness under the bead wire, can vary in the circumferential direction of the tire. In practice, this thickness can be measured in various meridian planes, distributed over the circumference of the tire, for example in 4 meridian planes distributed evenly around the circumference. Consequently, it is possible to deduce therefrom a mean thickness around the circumference of the tire. It is this mean thickness, measured under the bead wire, that has to remain less than 2 mm in the context of the invention.

According to a second essential feature of the invention, the carcass reinforcement is made up of a single carcass layer having a breaking strength Fr, expressed in daN/cm, that satisfies the relationship:

$$Fr>=Fs=(Cs*P\max*10^{-3})*((R^2-((R+Rj)/2)^2)/2)/Rj,$$

with

Fs: reference threshold strength (in daN/cm)

Cs: safety factor at least equal to 1,

Pmax: recommended maximum inflation pressure (in kPa),

R=D/2: outside radius of the tire (in mm),

Rj=Dj/2: nominal radius of the rim (in mm).

The composite material of which the carcass layer is made may be characterized mechanically by a law governing behaviour under tension, representing the traction force (in daN/cm), applied to the composite material, as a function of its relative elongation (in %). The limit point of this law governing behaviour corresponds to the breaking strength Fr of said composite material. According to the invention, the breaking strength Fr thus determined needs to be at least equal to a reference threshold strength Fs equal to $(Cs*Pmax*10^{-3})*((R^2-((R+Rj)/2)^2)/2)/Rj$.

In the expression of this reference threshold strength Fs, Pmax represents the maximum recommended maximum inflation pressure, expressed in kPa. Specifically, to have a correct connection between the tire and the rim, ensuring in particular a lack of rotation of the tire on its rim under the action of a torque, it is necessary for the heel of each bead of the tire to be clamped correctly on the rim. Since an agricultural tire has a relatively low inflation pressure in use, it is necessary, in order to correctly position the heels while the tire is being mounted on its rim, to use an inflation pressure that is generally higher than the use pressure. As a result, for obvious safety reasons, that is to say to avoid bursting of the tire during mounting, it is necessary to limit the inflation pressure on mounting to an admissible maximum value Pmax, recommended by tire manufacturers. For example, for an IF (Improved Flexion) tire, tire manufacturers may recommend a maximum inflation pressure Pmax equal to 250 kPa, in order to effect correct mounting of the tire on its rim. The inflation pressure is then adjusted depending on use. The safety factor Cs, which is at least equal to 1, is chosen by the tire designer depending on the desired level of safety. R is the outside radius of the tire, expressed in mm and equal to half the outside diameter D of the tire, defined as the "Design Overall Diameter" in the section devoted to "Agricultural equipment tires" in the "Standards Manual-2018" of the ETRTO standard. Rj is the nominal radius of the rim, expressed in mm and equal to half the nominal diameter Dj of the rim defined as the diameter at the seat of the rim, the seat being the portion of the rim in contact with the radially inner part of the bead, this diameter at the seat being defined as the "Nominal Rim Diameter" in the section devoted to "Agricultural equipment tires" in the "Standards Manual-2018" of the ETRTO standard. Lastly, the term "(R+Rj)/2" is the mean radius of the tire, defined as the mean of the outside radius of the tire and the nominal radius of the rim.

Preferably, Cs*Pmax is at least equal to 1000 kPa, in the expression of the reference threshold strength Fs. In this case, the value of Cs*Pmax is at least equal to the maximum value of the inflation pressure that is able to be delivered by a conventional compressor used to inflate a tire for an agricultural vehicle.

Even more preferably, Cs*Pmax is at least equal to 1500 kPa, in the expression of the reference threshold strength Fs. In this case, the value of Cs*Pmax is at least equal to the 1.5 times the maximum value of the inflation pressure that is able to be delivered by a conventional compressor used to inflate a tire for an agricultural vehicle. Consequently, the reference threshold strength Fs is increased by at least 50% compared with the previous case.

Advantageously, the mean thickness E of the carcass layer is at most equal to 1.2 mm. The more this mean thickness is limited, the lower the structural stiffness of the carcass reinforcement.

Usually, the textile reinforcers of the single carcass layer form an angle at least equal to 85° and at most equal to 95° with the circumferential direction of the tire. In other words, the carcass reinforcement is more or less perfectly radial.

Preferably, the textile reinforcers of the single carcass layer comprise an assembly made up of at least one multifilament strand made of aromatic polyamide or aromatic copolyamide and/or of aliphatic polyamide and/or of polyester and/or of cellulose.

A multifilament strand made of aromatic polyamide or aromatic copolyamide is itself made up of an assembly of filaments made of aromatic polyamide or aromatic copolyamide. As is well known, a filament made of aromatic polyamide or aromatic copolyamide is a filament of linear macromolecules formed of aromatic groups held together by amide bonds, at least 85% of which are directly connected to two aromatic cores, and more particularly poly(p-phenylene terephthalamide) (or PPTA) fibres, which are manufactured from optically anisotropic spinning compositions. Among the aromatic polyamides or aromatic copolyamides, mention may be made of polyaryl amides (or PAA, particularly known by the Solvay company trade name Ixef), poly(metaxylylene adipamide), polyphthalamides (or PPA, particularly known by the Solvay company trade name Amodel), amorphous semi-aromatic polyamides (or PA 6-3T, particularly known by the Evonik company trade name Trogamid), meta-aramids (or poly(metaphenylene isophthalamide) or PA MPD-I, particularly known by the Du Pont de Nemours company trade name Nomex) or para-aramids (or poly(paraphenylene terephthalamide) or PA PPD-T, particularly known by the Du Pont de Nemours company trade name Kevlar or the Teijin company trade name Twaron).

A multifilament strand made of aliphatic polyamide is made up of an assembly of filaments made of aliphatic polyamide. A filament made of aliphatic polyamide is understood to be a filament of linear macromolecules of polymers or copolymers containing amide functions that do not have aromatic rings and can be synthesized by polycondensation between a carboxylic acid and an amine Among the aliphatic polyamides, mention may be made of nylons PA4.6, PA6, PA6.6 or PA6.10, and in particular Zytel from the company DuPont, Technyl from the company Solvay or Rilsamid from the company Arkema.

Even more preferably, the textile reinforcers of the single carcass layer are hybrid textile reinforcers comprising an assembly made up of at least one multifilament strand made of aromatic polyamide or aromatic copolyamide, and of at least one multifilament strand made of aliphatic polyamide.

When the textile reinforcers of the single carcass layer comprise an assembly made up of at least one multifilament strand made of aromatic polyamide or aromatic copolyamide and/or of aliphatic polyamide and/or of polyester and/or of cellulose, or, even more preferably, are hybrid textile reinforcers comprising an assembly made up of at least one multifilament strand made of aromatic polyamide or aromatic copolyamide, and of at least one multifilament strand made of aliphatic polyamide, the carcass layer, in its vulcanized state and when removed from the tire, has a law governing its behaviour under tension having a secant modulus M1 at the equivalent force developed by the carcass layer at 1% elongation such that the ratio M1/Fr of the secant modulus M1 at the equivalent force developed by the carcass layer at 1% elongation to the breaking strength Fr of the carcass layer is strictly less than 7, preferably less than or equal to 5, and more preferably less than or equal to 4.

Since a carcass layer is made up of a juxtaposition of textile reinforcers that are coated in an elastomer-based material, are mutually parallel and distributed at a spacing P, the secant modulus M1 at the equivalent force developed by the carcass layer at 1% elongation is defined as the ratio MC1/P between the secant modulus MC1 at the equivalent force developed by a textile reinforcer at 1% elongation, expressed in daN/%, and the spacing P, expressed in cm. More specifically, the spacing P is the distance between the respective neutral axes of two consecutive reinforcers. In the usual case of a carcass layer wrapped around a circumferential reinforcing element or bead wire, in order to form a turn-up, the spacing P is measured in the carcass layer portion radially on the inside of the bead wire, the latter undergoing virtually zero shaping during manufacture, that is to say without significant variation in the spacing compared with the initial state. The secant modulus M1 is, consequently, expressed in daN/cm/%. The secant modulus MC1 at the equivalent force developed by a textile reinforcer at 1% elongation is the gradient of the straight line connecting the origin of the "Force-Elongation" curve obtained, for an individual textile reinforcer, under the conditions of the standard ASTM D 885/D 885M-10a of 2014, to the 1% abscissa point of this same curve.

The breaking strength Fr of the carcass layer, expressed in daN/cm, is defined as the ratio FCr/P between the force at break FCr of a textile reinforcer, expressed in daN, and the spacing P, expressed in cm. The force at break FCr of a textile reinforcer is the limit force of the "Force-Elongation" curve of the textile reinforcer, obtained under the conditions of the standard ASTM D 885/D 885M-10a of 2014.

The ratio M1/Fr advantageously makes it possible to quantify the stiffness of the carcass layer as a function of its breaking strength with the aid of a dimensionless criterion, which is valid for all of the usual tire sizes in the field of agriculture.

A ratio M1/Fr greater than 7 would make it difficult to shape the carcass layer, during the moulding of the tire before the step of curing the tire, with a risk of the carcass layer becoming disorganized as a result of the textile reinforcers passing through the coating compound of said textile reinforcers.

Advantageously, the ratio M1/Fr of the secant modulus M1 at the equivalent force developed by the carcass layer at 1% elongation to the breaking strength Fr of the carcass layers is greater than or equal to 0.5.

A ratio M1/Fr lower than 0.5 would make it difficult to handle the carcass layer, during the manufacture of the tire, on account of the stiffness of said carcass layer being too low.

According to a first embodiment variant, the hybrid textile reinforcers of the carcass layer comprise an assembly made up of two multifilament strands made of aromatic polyamide or aromatic copolyamide, and of a single multifilament strand made of aliphatic polyamide, the strands being wound together in a helix.

This first embodiment variant makes it possible to achieve a good compromise between breaking strength and industrial cost. A high breaking strength is achieved by virtue of the use of a reinforcer comprising 75% aromatic polyamide, generally aramid, aramid makes it possible to form high-tenacity multifilament strands. Moreover, from an economic standpoint, the first embodiment variant has an assembly structure allowing correct productivity during manufacture on the machines for twisting the textile reinforcers.

According to a second embodiment variant, the hybrid textile reinforcers of the carcass layer comprise an assembly made up of a single multifilament strand made of aromatic polyamide or aromatic copolyamide, and of a single multifilament strand made of aliphatic polyamide, the strands being wound together in a helix.

This second embodiment variant, which contains only 60% aromatic polyamide or aramid, rather than 75%, is not as good as the first embodiment variant in terms of breaking strength. On the other hand, it has a lower materials cost than that of the first embodiment variant. Furthermore, on account of the structure of its assembly, it allows high productivity during manufacture on the machines for twisting the textile reinforcers, and hence a less high manufacturing cost. Consequently, the overall industrial cost of this second embodiment variant is less high than that of the first embodiment variant.

According third embodiment variant, the hybrid textile reinforcers of the carcass layer comprise an assembly made up of a core made up of a first multifilament strand made of aliphatic polyamide, and of a layer comprising at least two second multifilament strands made of aromatic polyamide or aromatic copolyamide, the second strands of the layer being wound together in a helix around the core.

This third variant is a hybrid textile reinforcer usually known as a “Core Insertion” hybrid textile reinforcer, i.e. one with insertion of a core within a layer of multifilament strands. The construction of such a reinforcer is flexible and multifunctional and makes it possible, in particular, to alter the secant modulus M1 via an appropriate choice of the parameters of twisting and of thermal sizing treatment. On the other hand, on account of the structure of the assembly, it is more expensive to manufacture a hybrid textile reinforcer than the two above-described embodiment variants.

Advantageously, with each crown layer having a law governing its behaviour under tension characterized by a secant modulus at break M'=F'r/A'r (in daN/cm/%), F'r being the breaking strength of the crown layer (in daN/cm) and A'r its elongation at break (in %), the crown reinforcement, comprising at least two crown layers that each have a secant modulus at break M', has a resultant modulus at break M's, defined as the sum of the secant moduli at break M' of all of the crown layers, at least equal to 150 daN/cm/%, preferably at least equal to 300 daN/cm/%.

A sufficiently stiff crown reinforcement, with a secant modulus at break M's at least equal to 150 daN/cm/%, makes it possible to ensure a correct transverse thrust of the tire, and, consequently, satisfactory handling in the field, in spite of a low inflation pressure of the tire.

Preferably, the reinforcers of the at least two crown layers of the crown reinforcement are metallic.

The use of metal reinforcers for the crown layers makes it possible to easily achieve the minimum transverse stiffness required for the crown reinforcement, minimizing the number of crown layers and therefore the structural bending stiffness with regard to the flattening of the tread.

Even more preferably, the metal reinforcers of the at least two crown layers of the crown reinforcement have a law governing their two-way elastic behaviour comprising a first portion having a first tensile modulus MG1 at most equal to 30 GPa, and a second portion having a second tensile modulus MG2 at least equal to 2 times the first tensile modulus MG1, said law governing the behaviour under tension being determined for a metal reinforcer coated in an elastomeric compound having a tensile elastic modulus at 10% elongation MA10 at least equal to 5 MPa and at most equal to 15 MPa, and any metal reinforcer of a crown layer has a law governing its behaviour under compression that is characterized by a critical buckling strain E0 at least equal to 3%, said law governing behaviour under compression being determined on a test specimen made up of a reinforcer placed at its centre and coated with a parallelepipedal volume of an elastomeric compound having a tensile elastic modulus at 10% elongation MA10 at least equal to 5 MPa and at most equal to 15 MPa.

This preferred crown reinforcement variant having at least two crown layers with metal reinforcers is therefore characterized by the use of elastic metal reinforcers of which the laws governing their behaviour have specific characteristics both under tension and under compression.

As regards its behaviour under tension, a metal reinforcer is mechanically characterized, usually in a bare state, i.e. in a state not coated with an elastomeric material, by a curve representing the traction force (in N) applied to the metal reinforcer as a function of its relative elongation (in %), known as the force-elongation curve. Mechanical characteristics under tension of the metal reinforcer, such as the structural elongation As (in %), the total elongation at break At (in %), the force at break Fm (maximum load in N) and the breaking strength Rm (in MPa) are deduced from this force-elongation curve, these characteristics being measured, for example, in accordance with the standard ISO 6892 of 1984, or the standard ASTM D2969-04 of 2014.

In practice, a metal reinforcer, removed from the tire, is coated in a vulcanized elastomer-based material. It is possible to determine the law governing the behaviour of this metal reinforcer removed from the tire, and therefore coated, on the basis of the standard ISO 6892 of 1984 in the same way as for a bare metal reinforcer. By way of example, and nonlimitingly, the vulcanized elastomeric coating material is a rubber-based composition having a secant tensile elastic modulus at 10% elongation MA10 at least equal to 5 MPa and at most equal to 15 MPa, for example equal to 6 MPa, this tensile elastic modulus being determined from traction tests carried out in accordance with the French standard NF T 46-002 of September 1988.

From the force-elongation curve that characterizes the behaviour under tension of the reinforcer, it is possible to define a stress-strain curve, the stress being equal to the ratio between the traction force applied to the reinforcer and the cross-sectional area of the reinforcer, and the strain being the relative elongation of the reinforcer. For a bi-modulus elastic behaviour law comprising a first portion and a second portion, it is thus possible to define a first tensile modulus MG1 representing the gradient of the secant straight line passing through the origin of the frame of reference in which the behaviour law is represented, and the transition point marking the transition between the first and second portions. Likewise, it is possible to define a second tensile modulus MG2 representing the gradient of a straight line passing through two points positioned in a substantially linear part of the second portion.

In the considered preferred variant of metal reinforcers, any metal reinforcer of a crown layer, removed from the tire, thus has a law, known as a bi-modulus law, governing its elastic behaviour under tension, comprising a first portion having a first tensile modulus MG1 at most equal to 30 GPa, and a second portion having a second tensile modulus MG2 at least equal to 2 times the first tensile modulus MG1.

As regards its behaviour under compression, a metal reinforcer is mechanically characterized by a curve representing the compression force (in N) applied to the metal reinforcer as a function of its compression strain (in %). Such a compression curve is particularly characterized by a limit point, defined by a critical buckling force Fc, and a critical buckling strain E0, beyond which the reinforcer experiences compressive buckling, corresponding to a state of mechanical instability characterized by large amounts of deformation of the reinforcer with a reduction in the compressive force.

The law governing the behaviour under compression is determined, using a test machine of the Zwick or Instron type, on a test specimen measuring 12 mm×21 mm×8 mm (width×height×thickness). The test specimen consists of a reinforcer placed at its centre and coated with a parallelepipedal volume of an elastomeric compound defining the volume of the test specimen, the axis of the reinforcer being positioned along the height of the test specimen. In the context of the invention, the elastomeric compound of the test specimen has a secant tensile elastic modulus at 10% elongation MA10 at least equal to 5 MPa and at most equal to 15 MPa, for example equal to 6 MPa. The test specimen is compressed in the heightwise direction at a rate of 3 mm/min until compressive deformation is achieved, namely until the test specimen is compressed by an amount equal to 10% of its initial height, at ambient temperature. The critical buckling force Fc and the corresponding critical buckling strain E0 are reached when the applied force decreases while the strain continues to increase. In other words, the critical buckling force Fc corresponds to the maximum compression force Fmax.

In the considered preferred variant of metal reinforcers, any metal reinforcer of a crown layer has a law governing its behaviour under compression that is characterized by a critical buckling strain under compression E0 at least equal to 3%.

The inventors have demonstrated that metal reinforcers referred to as being elastic, which are characterized by laws governing their behaviour under tension and under compression, as described above, have a fatigue endurance limit, during repeated alternating cycles of tensile/compressive loadings, that is higher than that of the usual metal reinforcers.

Specifically, when a tire for an agricultural vehicle, comprising a tread having raised elements, for example lugs, is being driven on, the tilting of the raised elements under (driving or braking) torque causes the crown layers positioned radially on the inside of the raised elements to tilt. This tilting leads to curvatures, which alternate between positive and negative, of the crown layers, and correspondingly to alternating cycles of compressive/tensile loadings of the metal reinforcers of the crown layers.

It should also be noted that the crown layers of a tire for an agricultural vehicle often have initial curvatures, both in the circumferential direction and in the axial direction, as a result of the movements of the various elastomeric components and of the reinforcers during the course of manufacture, while the tire is being moulded and cured. These initial deformations combine with the deformations resulting from the tilting of the lugs and therefore likewise contribute to the cycles of compressive/tensile loadings of the metal reinforcers of the crown layers while the tire is being driven on.

Thus, crown layer elastic metal reinforcers according to this preferred variant are able to withstand the above-described cycles of compressive/tensile loadings better, leading to an improvement in the endurance of the crown reinforcement of the tire and therefore to a lengthening of the service life of the tire.

According to one particular embodiment of the above-described preferred variant, any metal reinforcer of a crown layer is a multi-strand rope of structure 1×N comprising a single layer of N strands wound in a helix, each strand comprising an internal layer of M internal threads wound in a helix and an external layer of P external threads wound in a helix around the internal layer.

According to a first variant of a low pressure tire, the tire for an agricultural vehicle is an IF (Improved Flexion) tire within the meaning of the ETRTO standard, in its "Standards Manual-2018", in the section devoted to "Agricultural equipment tires".

According to a second variant of a low pressure tire, the tire for an agricultural vehicle is a VF (Very high Flexion) tire within the meaning of the ETRTO standard, in its "Standards Manual-2018", in the section devoted to "Agricultural equipment tires".

BRIEF DESCRIPTION OF THE DRAWINGS

The features of the invention are illustrated by the schematic FIGS. 1 to 8, which are not drawn to scale.

DETAILED DESCRIPTION OF THE DRAWINGS

Figure 1:
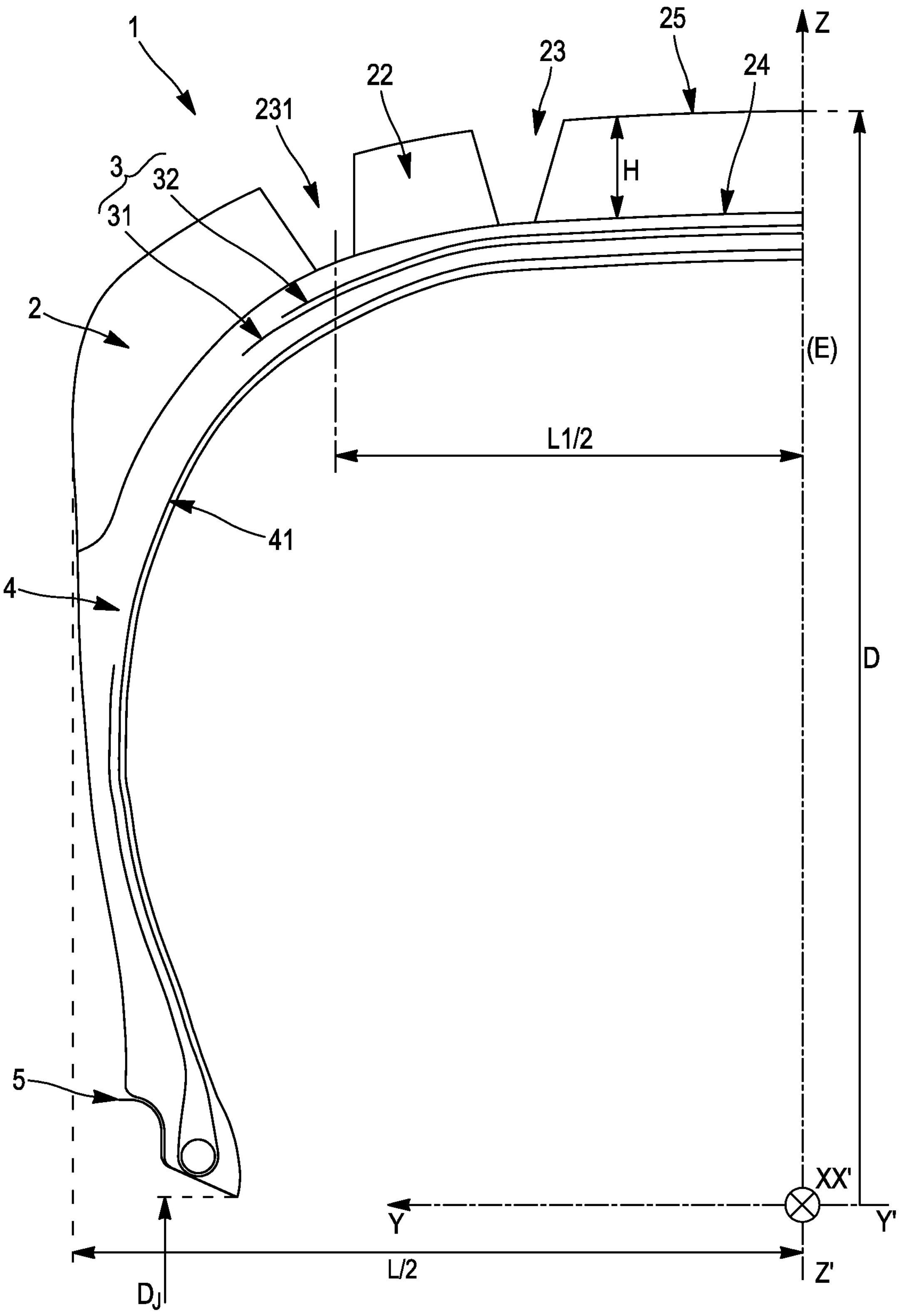
FIG. 1: Meridian half-section of a tire for an agricultural vehicle according to the invention.

FIG. 1 is a meridian half-section, in a meridian plane YZ, of a tire 1 for an agricultural vehicle according to the invention. The tire 1 for an agricultural vehicle is intended to be mounted on a rim 5 having a nominal diameter Dj and to be inflated to a recommended minimum pressure at most equal to 240 kPa. It has an outside diameter D and comprises, radially from the outside to the inside, a tread 2, a crown reinforcement 3 and a carcass reinforcement 4. The tread 2 comprises tread pattern elements 22 that are separated from one another by voids 23 and has a radial height H at least equal to 20 mm and at most equal to 60 mm, measured between a tread surface 25 and a bearing surface 24 parallel to the tread surface 25 and tangential to the bottoms of the deepest voids. The tread 2 has an axial width L and comprises two axially outer substantially longitudinal voids 231 which are positioned on either side of an equatorial plane XZ passing through the middle of the tread 2 and are spaced apart from one another by a mean axial distance L1 at least equal to 0.5*L. In the half-section in the figure, only the axial half-width L and the half-distance L½ between an axially outer longitudinal void 231 and the equatorial plane XZ are shown. Moreover, the tread 2 has an overall volumetric void ratio TEV, defined as the ratio between the volume VC of voids 23 and the total volume V of the tread 2 assumed to be free of voids, comprised between the bearing surface 24 and the tread surface 25, at least equal to 30% and at most equal to 60%. The crown reinforcement 3 comprises two crown layers (31, 32), each comprising metal reinforcers that are coated in an elastomer-based material, are mutually parallel, are crossed from one layer to the next and form an angle at least equal to 10° with the circumferential direction XX' of the tire. The carcass reinforcement 4 comprises a single carcass layer 41 comprising textile reinforcers that are coated in an elastomer-based material, are mutually parallel, are crossed from one layer to the next and form an angle at least equal to 85° and at most equal to 95° with the circumferential direction XX' of the tire.

Figure 2:
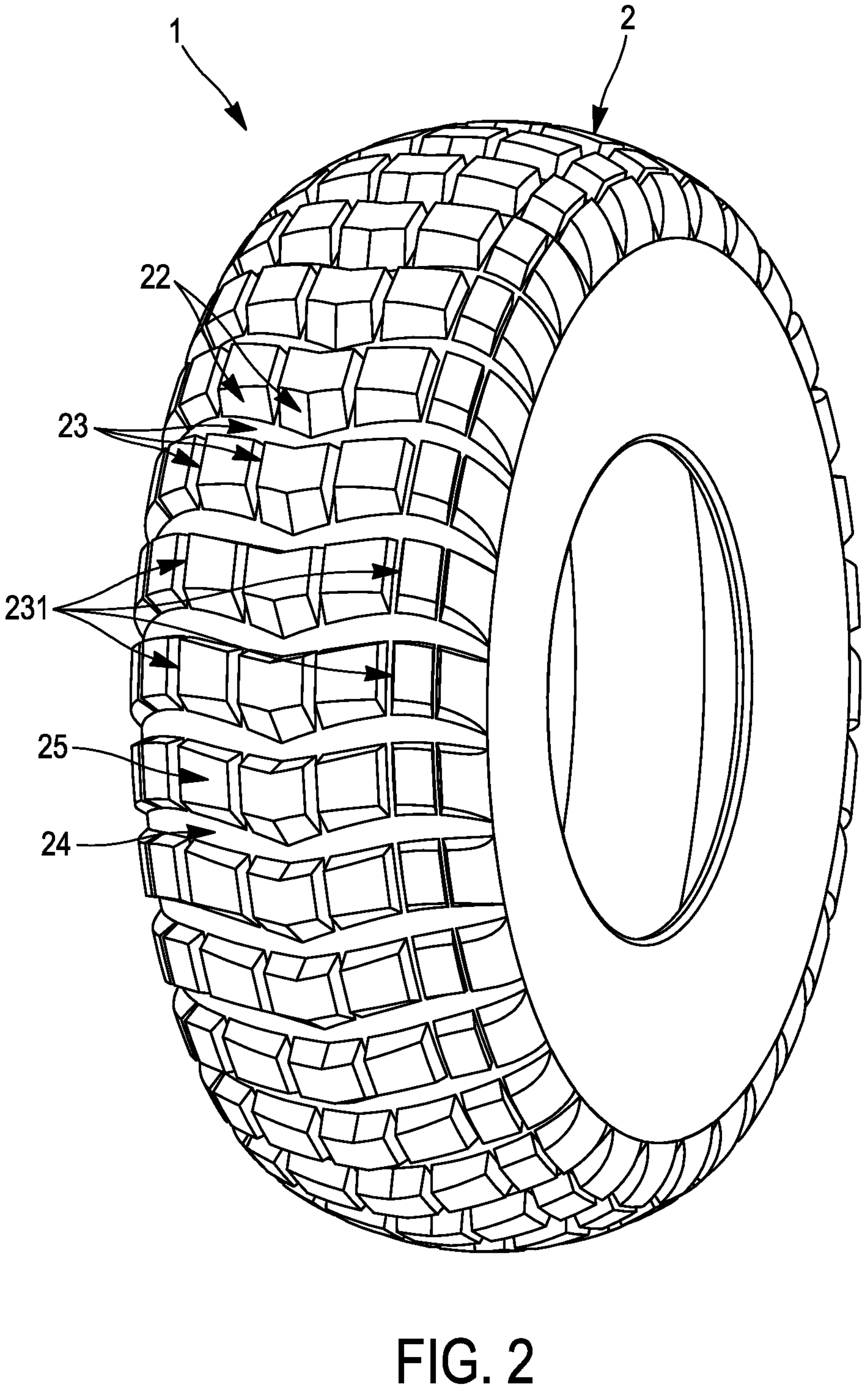
FIG. 2: Perspective view of a tire for an agricultural vehicle according to the invention.

FIG. 2 is a perspective view of a tire 1 for an agricultural vehicle according to the invention. The tread 2 comprises tread pattern elements 22 that are separated from one another by voids 23 and has a radial height H at least equal to 20 mm and at most equal to 60 mm, measured between a tread surface 25 and a bearing surface 24 parallel to the tread surface 25 and tangential to the bottoms of the deepest voids. In the embodiment shown, the raised elements are grouped together into five circumferential rows of blocks. The blocks 22 are separated from one another by voids 23 that are either substantially longitudinal, in the circumferential direction, or substantially transverse, in the axial direction. The tread 2 comprises at least two circumferential distributions of axially outer substantially longitudinal voids 231 that act as hinges and make the flattening of the tread easier. Lastly, the tread 2 has an open tread pattern with an overall volumetric void ratio TEV, defined as the ratio between the volume VC of voids 23 and the total volume V of the tread 2 assumed to be free of voids, comprised between the bearing surface 24 and the tread surface 25, at least equal to 30% and at most equal to 60%.

Figure 3:
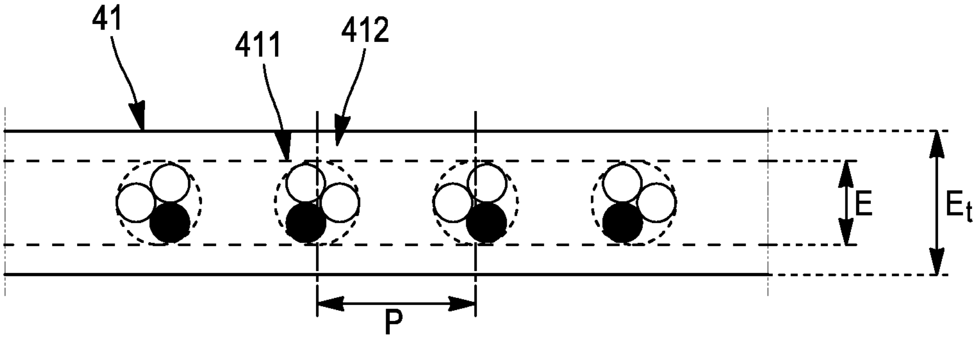
FIG. 3: View in cross section of a carcass layer portion.

FIG. 3 is a view in cross section of a portion of a carcass layer 41, the cross section being taken perpendicularly to the direction of the reinforcers 411. The carcass layer 41 comprises textile reinforcers 411 coated in an elastomer-based material 412. It has a total thickness Et and a trimmed thickness E corresponding to the diameter of the reinforcers. It is a mean value of this trimmed thickness E that, according to the invention, needs to be at least equal to 2 mm. This trimmed thickness E is measured on the cross section of the carcass layer portion. FIG. 2 also shows the spacing P, the distance between the mean lines of two consecutive reinforcers.

Figure 4:
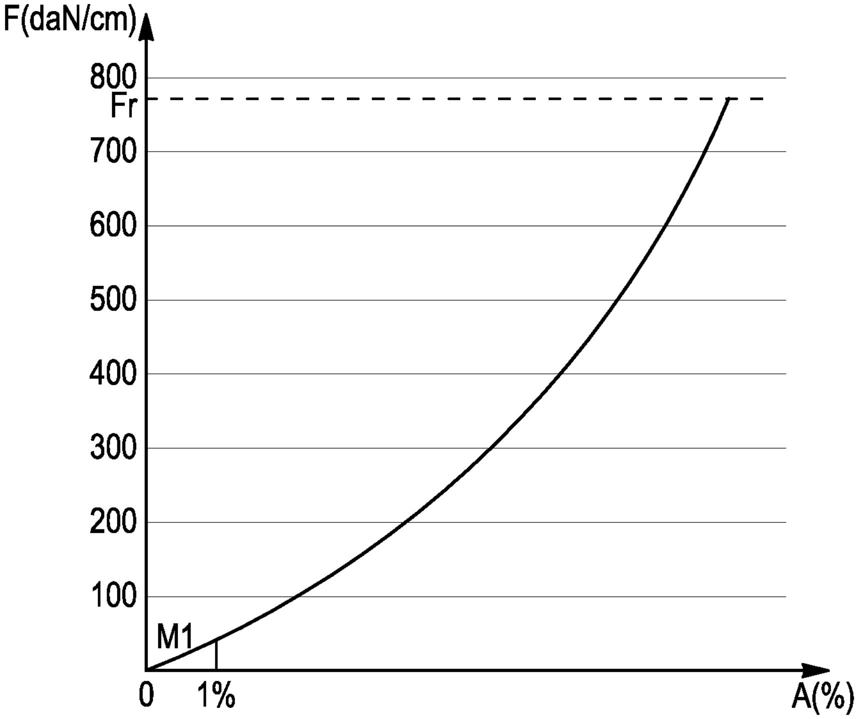
FIG. 4: Model law governing behaviour under tension for a carcass layer comprising hybrid textile reinforcers according to a preferred embodiment of the invention.

FIG. 4 shows a model law governing behaviour under tension for a carcass layer comprising hybrid textile reinforcers according to a preferred embodiment of the invention. This law governing behaviour represents the unitary tensile force F, expressed in daN/cm, applied to the carcass layer, as a function of its relative elongation A, expressed in %. In the example shown, the breaking strength Fr is equal to 775 daN/cm. In addition, the secant modulus M1 at the equivalent force developed by the carcass layer at 1% elongation is such that the ratio M1/Fr of the secant modulus M1 to the breaking strength Fr is equal to 3.5, and therefore less than 4.

Figure 5:
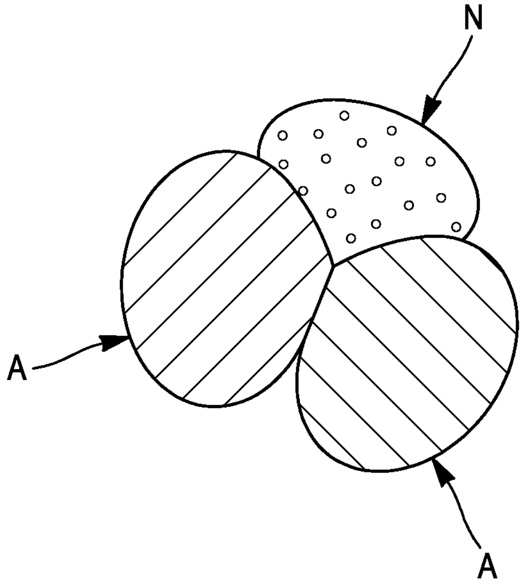
FIG. 5: Section of a hybrid textile reinforcer for a carcass layer according to a first variant of the preferred embodiment of the invention.

FIG. 5 shows the section of a hybrid textile reinforcer for a carcass layer according to a first variant of the preferred embodiment of the invention. In this first variant, the hybrid textile reinforcers of the carcass layer comprise an assembly (A/A/N) made up of two multifilament strands made of aramid (A), and of a single multifilament strand made of nylon (N), the strands being wound together in a helix.

Figure 6:
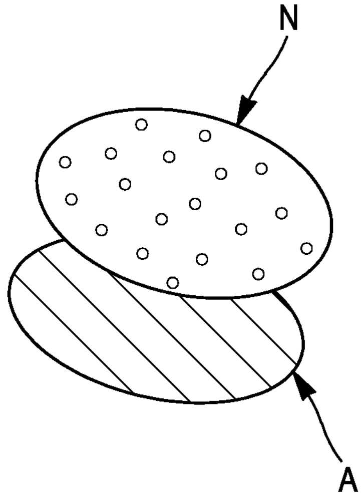
FIG. 6: Section of a hybrid textile reinforcer for a carcass layer according to a second variant of the preferred embodiment of the invention.

FIG. 6 shows the section of a hybrid textile reinforcer for a carcass layer according to a second variant of the preferred embodiment of the invention. In this second variant of the preferred embodiment of the invention, the hybrid textile reinforcers of the carcass layer comprise an assembly (A/N) made up of a single multifilament strand made of aramid (A), and of a single multifilament strand made of nylon (N), the strands being wound together in a helix.

Figure 7:
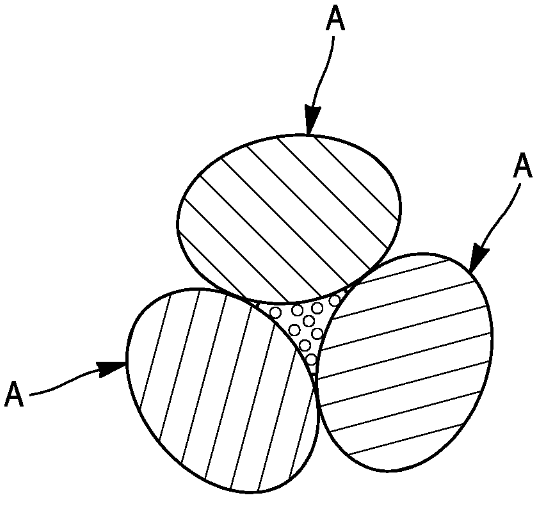
FIG. 7: Section of a hybrid textile reinforcer for a carcass layer according to a third variant of the preferred embodiment of the invention.

FIG. 7 shows the section of a hybrid textile reinforcer for a carcass layer according to a third variant of the preferred embodiment of the invention. In this third variant, the hybrid textile reinforcers of the carcass layer comprise an assembly (N+A/A/A) made up of a core made up of a first multifilament strand made of nylon (N), and of a layer comprising three second multifilament strands made of aramid (A), the second strands of the layer being wound together in a helix around the core. This type of hybrid textile reinforcer is usually referred to as a “Core Insertion” reinforcer.

Figure 8:
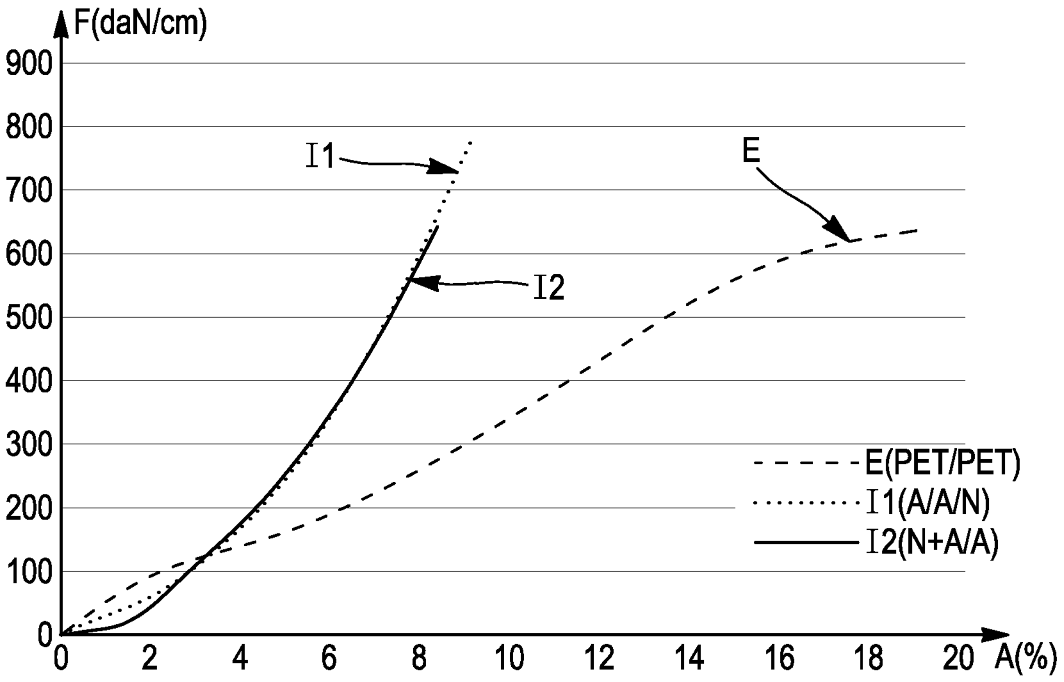
FIG. 8: Respective laws governing behaviour under tension of a carcass layer comprising hybrid textile reinforcers according to two embodiment variants of the invention, and of a carcass layer comprising textile reinforcers of the prior art considered as reference.

FIG. 8 shows the respective laws governing behaviour under tension of a carcass layer comprising hybrid textile reinforcers according to the embodiment variants shown in FIGS. 5 and 7, and of a carcass layer comprising textile reinforcers of the prior art considered as reference. Each law governing behaviour represents the unitary tensile force F, expressed in daN/cm, applied to the carcass layer, as a function of its relative elongation A, expressed in %. The law governing behaviour I1 relates to a carcass layer comprising hybrid textile reinforcers of the carcass layer comprising an assembly (A/A/N) made up of two multifilament strands made of aramid (A), and of a single multifilament strand made of nylon (N), the strands being wound together in a helix. The law governing behaviour I2 relates to a carcass layer comprising hybrid textile reinforcers comprising an assembly (N+A/A/A) made up of a core made up of a first multifilament strand made of nylon (N), and of a layer comprising three second multifilament strands made of aramid (A), the second strands of the layer being wound together in a helix around the core. The law governing behaviour E relates to a carcass layer comprising textile reinforcers comprising an assembly (PET/PET) of two multifilament strands made of polyester of the PET (polyethylene terephthalate) type of the reference prior art. For the respective laws governing behaviour I1 and I2, the secant moduli M1 at the equivalent force developed by the carcass layer at 1% elongation are such that the ratios M1/Fr of the secant modulus M1 to the breaking strength Fr of the carcass layer are respectively equal to 3.5 and 0.8, and therefore less than 4. The breaking strengths Fr are respectively equal to 775 daN/cm for I1 and 641 daN/cm for 12. The above values are to be compared with the reference prior art, for which the ratio M1/Fr is equal to 7.7, for a breaking strength Fr equal to 213 daN/cm. Thus, the carcass layers according to the invention have a secant modulus M1 at 1% elongation that is lower than the reference, and a higher breaking strength Fr, the latter being achieved for a relative elongation at break Ar at least 50% less than that of the reference.

The invention was studied more particularly in the case of a tire for an agricultural vehicle of size 710/70R42 VF, i.e. having, according to the definitions in the ETRTO standard, a section width S=710 mm, a ratio of the section height to the section width H/S=70% and a mounting rim having a diameter Dj=42 inches=1066.8 mm. This tire is also a VF (Very high Flexion) tire. From the above features, it is possible to deduce the outside radius of the tire R=Rj+H, with Rj, the rim radius, being equal to Dj/2=533.4 mm and H=0.7*S=497 mm With these conditions, R is equal to 533.4+497=1030.4 mm Taking Cs*Pmax to be equal to 1000 kPa, the reference threshold strength Fs is equal to $Fs=(Cs*Pmax*10^{-3})*((R^2-((R+Rj)/2)^2)/2)/Rj=10^3*10^{-3}*(1030.4^2-((1030.4+533.4)/2)^2)/2)533.4=422$ daN/cm. Consequently, the carcass reinforcement, made up of a single carcass layer, must have a mean thickness E at most equal to 2 mm and a breaking strength Fr at least equal to Fs=422 daN/cm.

Table 1 below presents the characteristics of the respective textile reinforcers of the compared carcass layers, corresponding to those of which the laws governing behaviour are presented in FIG. 8, namely the reference carcass layer with textile reinforcers comprising an assembly of 2 strands made of PET, a carcass layer according to a first embodiment I1 with hybrid textile reinforcers comprising an assembly made up of two multifilament strands made of aramid, and of a single multifilament strand made of nylon, and a carcass layer according to a second embodiment 12 with hybrid textile reinforcers comprising an assembly made up of a core made up of a first multifilament strand made of nylon, and of a layer comprising three second multifilament strands made of aramid.

TABLE 1

| Carcass layer | E | I1 | I2 |
|---|---|---|---|
| Nature of the strands | PET/PET | Aramid/ Aramid/Nylon | Nylon/1 + Aramid/3 |
| Counts of the strands (tex) | 144/144 | 330/330/188 | 47 + 167/167/167 |
| Twists T of the strands (turns/m) | 420/420 | 270/270 | 340 + 315/315 |
| Twist factor K | 192 | 212 | 196 |
| Density (number of reinforcers/dm) | 120 | 67 | 81 |
| Reinforcer diameter d (mm) | 0.62 mm | 1.11 mm | 0.92 mm |

TABLE 1-continued

| Carcass layer | E | I1 | I2 |
|---|---|---|---|
| Layer thickness Et (mm) | 1.41 mm | 1.90 mm | 1.80 mm |
| Ratio d/Et | 0.44 | 0.58 | 0.51 |

Definition of the characteristics in Table 1:

Count of the strands (tex): mass in g of a multifilament strand of length equal to 10 000 m (1 tex=1 g/10 000 m).

Twist T of the strands (turns/m): number of twist turns applied. The $1^{st}$ value is the twist applied to a multifilament strand in a first direction of twisting S, and the $2^{nd}$ value is the twist applied to the assembly of elementary multifilament strands in a second direction of twisting Z, opposite to the first.

Twist factor K: The twist factor K is defined by the relationship $K=T\times[(Count/(1000\cdot\rho)]^{1/2}$, in which the twist T of the assembly of elementary multifilament strands, that is to say of the reinforcer, is expressed in the number of turns per metre, the count of the reinforcer is expressed in tex (mass in g of a reinforcing element having a length equal to 10 000 m), and lastly p is the density or mass per unit volume (in g/cm3) of the material (for example: around 1.50 g/cm3 for cellulose, 1.44 g/cm3 for aramid, 1.38 g/cm3 for a polyester such as PET, 1.14 g/cm3 for nylon). In the case of a hybrid reinforcer, p is a mean of the densities weighted by the respective counts of the materials of the reinforcing element.

Density (number of reinforcers/dm): Number of reinforcers per dm of carcass layer. It is the reverse of the spacing P separating the mean lines of two consecutive reinforcers.

Diameter d of the reinforcer (mm) Diameter of the circle circumscribed on the assembly of multifilament strands making up the reinforcer.

Layer thickness Et (mm): Total thickness of the carcass layer, equal to the sum of the diameter of the reinforcer d and the thicknesses of the elastomeric compound, known as the skim compound, coating the reinforcers on either side. The trimmed thickness E of the carcass layer is equal to the diameter d of the reinforcer.

Table 2 below presents, for a carcass layer according to the reference E, and for the respective carcass layers according to the embodiment variants I1 and I2 of the invention, the following mechanical characteristics:

TABLE 2

| Carcass layer | E | I1 | I2 |
|---|---|---|---|
| Breaking strength Fr of a carcass layer (daN/cm) | 213 daN/cm | 775 daN/cm | 641 daN/cm |
| Ratio M1/Fr of the secant modulus M1 at 1% elongation to the breaking strength Fr of the carcass layer | 7.70 | 3.53 | 0.82 |

The reference tire, comprising a carcass reinforcement having three carcass layers, each carcass layer having the characteristics of the reference E in Tables 1 and 2, was compared with two tires comprising a carcass reinforcement having a single carcass layer, having the characteristics of the variants I1 and I2 in Tables 1 and 2. Table 3 below presents this comparison:

TABLE 3

| Tire | E | I1 | I2 |
|---|---|---|---|
| Number of carcass layers | 3 | 1 | 1 |
| Total thickness of the carcass reinforcement (mm) | 4.23 mm | 1.90 mm | 1.80 mm |
| Trimmed thickness E of the single-layer carcass reinforcement (mm) | N/A | 1.11 mm | 0.92 mm |
| Total breaking strength of the carcass reinforcement (daN/cm) | 638 daN/cm | 775 daN/cm | 641 daN/cm |

Table 3 shows that the carcass reinforcements of the variants I1 and I2 clearly comply with the two essential characteristics of the invention: a mean thickness E less than 2 mm, and even less than 1.2 mm, and a breaking strength Fr greater than the reference threshold strength Fs=422 daN/cm.

Table 4 below presents the characteristics of the tread pattern and crown reinforcement combined with the characteristics of the carcass reinforcement, for the reference E and the embodiment variant I1.

TABLE 4

| Characteristics | Reference E (710/70R42 IF 179D Michelin AXIOBIB) | Invention I1 (710/70R42 VF 179D) |
|---|---|---|
| Number of carcass layers | 3 | 1 |
| Nature of the reinforcers of the carcass layer | PET/PET | Aramid/Aramid/Nylon |
| Number of crown layers | 6 | 2 |
| Nature of the reinforcers of the crown layer | Assembly of 3 rayon threads, having a diameter equal to 0.94 mm | Elastic metal reinforcer 24.26, made up of 24 steel threads, having a unit diameter equal to 26/100 mm, distributed in 4 strands of 6 threads |
| Overall volumetric void ratio TEV of the tread | >65% | <50% |
| Mean radial height H of the tread | 65 mm | 45 mm |
| Type of tread pattern of the tread | Lugged tread pattern | Tread pattern having blocks comprising 4 longitudinal voids, axially positioned on either side of the median equatorial plane of the tire, the two intermediate longitudinal voids being spaced apart from one another by an axial distance equal to 370 mm and the two axially outer longitudinal voids being spaced apart from one another by an axial distance equal to 568 mm. |

The reduction in structural stiffness of the tire, targeted by the inventors and obtained by virtue of a single-layer carcass reinforcement as proposed by the invention, can also be enhanced by the combination of said single-layer carcass reinforcement with a crown reinforcement and a tread that are less thick than those of the reference tire. Thus, the crown reinforcement advantageously comprises two crown layers having elastic metal reinforcers, rather than six layers of textile reinforcers made of rayon. Furthermore, the traditional tread with a lugged tread pattern also advantageously comprises a tread pattern with blocks of smaller radial height (45 mm rather than 65 mm), and therefore thinner, but with a volumetric void ratio that is lower (less than 50% rather than greater than 60%), and therefore more closed. This tread pattern having blocks lastly comprises two axially outer longitudinal voids that are sufficiently far apart from one another (568 mm) to provide a hinge function, ensuring that the flattening of the tread is easier.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an agricultural vehicle, intended to be mounted on a rim having a nominal diameter Dj and to be inflated to a recommended minimum pressure at most equal to 240 kPa and a maximum pressure of at most 440 kPa, having an outside diameter D and comprising, radially from the outside to the inside, a tread, a crown reinforcement and a carcass reinforcement:

the tread comprising tread pattern elements that are separated from one another by circumferential and transverse voids and having a radial height H at least equal to 20 mm and at most equal to 50 mm, measured between a tread surface and a bearing surface parallel to the tread surface and tangential to the bottoms of the deepest voids, the tread, which has an axial width L, comprising at least two axially outer voids, each having a mean line that forms an angle at most equal to 45° with a circumferential direction (XX') of the tire, which are positioned on either side of an equatorial plane (XZ) passing through the middle of the tread and are spaced apart from one another by a mean axial distance L1 at least equal to 0.5*L, the tread having an overall volumetric void ratio TEV, defined as the ratio between the volume VC of voids and the total volume V of the tread assumed to be free of voids, comprised between the bearing surface and the tread surface, at least equal to 30% and at most equal to 60%, the crown reinforcement comprising at least two crown layers, each comprising metal reinforcers that are coated in an elastomer-based material, are mutually parallel, are crossed from one layer to the next and form an angle at least equal to 10° with the circumferential direction (XX') of the tire, the carcass reinforcement comprising one carcass layer comprising textile reinforcers that are coated in an elastomer-based material, are mutually parallel and form an angle at least equal to 75° and at most equal to 105° with the circumferential direction (XX') of the tire, wherein the carcass reinforcement is made up of a single carcass layer having a mean thickness E at most equal to 2 mm and a breaking strength Fr, expressed in daN/cm, that satisfies the relationship:

$$Fr>=Fs=(Cs*P\max*10^{-3})*((R^2-((R+Rj)/2)^2)/2)/Rj,$$

with

Fs: reference threshold strength (in daN/cm)

Cs: safety factor at least equal to 1,

Pmax: recommended maximum inflation pressure (in kPa),

R=D/2: outside radius of the tire (in mm),

Rj=Dj/2: nominal radius of the rim (in mm), wherein Cs*Pmax is at least 1000 kPa.

2. The tire according to claim 1, wherein Cs*Pmax is at least equal to 1500 kPa.

3. The tire according to claim 1, wherein the mean thickness E of the carcass layer is at most equal to 1.2 mm.

4. The tire according to claim 1, wherein the textile reinforcers of the single carcass layer comprise an assembly made up of at least one multifilament strand made of aromatic polyamide or aromatic copolyamide and/or of aliphatic polyamide and/or of polyester and/or of cellulose.

5. The tire according to claim 4, wherein the carcass layer, in its vulcanized state and when removed from the tire, has a law governing its behaviour under tension having a secant modulus M1 at the equivalent force developed by the carcass layer at 1% elongation such that the ratio M1/Fr of the secant modulus M1 at the equivalent force developed by the carcass layer at 1% elongation to the breaking strength Fr of the carcass layer is strictly less than 7.

6. The tire according to claim 5, wherein the ratio M1/Fr of the secant modulus M1 at the equivalent force developed by the carcass layer at 1% elongation to the breaking strength Fr of the carcass layers is greater than or equal to 0.5.

7. The tire according to claim 4, wherein the hybrid textile reinforcers of the carcass layer comprise an assembly made up of two multifilament strands made of aromatic polyamide or aromatic copolyamide, and of a single multifilament strand made of aliphatic polyamide, the strands being wound together in a helix.

8. The tire according to claim 4, wherein the hybrid textile reinforcers of the carcass layer comprise an assembly made up of a single multifilament strand made of aromatic polyamide or aromatic copolyamide, and of a single multifilament strand made of aliphatic polyamide, the strands being wound together in a helix.

9. The tire according to claim 4, wherein the hybrid textile reinforcers of the carcass layer comprise an assembly made up of a core made up of a first multifilament strand made of aliphatic polyamide, and of a layer comprising at least two second multifilament strands made of aromatic polyamide or aromatic copolyamide, the second strands of the layer being wound together in a helix around the core.

10. The tire according to claim 1, wherein the textile reinforcers of the single carcass layer are hybrid textile reinforcers comprising an assembly made up of at least one multifilament strand made of aromatic polyamide or aromatic copolyamide, and of at least one multifilament strand made of aliphatic polyamide.

11. The tire according to claim 1, each crown layer having a law governing its behaviour under tension characterized by a secant modulus at break M'=F'r/A'r (in daN/cm/%), F'r being the breaking strength of the crown layer (in daN/cm) and A'r its elongation at break (in %), wherein the crown reinforcement, comprising at least two crown layers that each have a secant modulus at break M', has a resultant modulus at break M's, defined as the sum of the secant moduli at break M' of all of the crown layers, at least equal to 150 daN/cm/%, preferably at least equal to 300 daN/cm/%.

12. The tire according to claim 11, wherein the metal reinforcers of the at least two crown layers of the crown reinforcement have a law governing their two-way elastic behaviour comprising a first portion having a first tensile modulus MG1 at most equal to 30 GPa, and a second portion having a second tensile modulus MG2 at least equal to 2 times the first tensile modulus MG1, said law governing the behaviour under tension being determined for a metal reinforcer coated in an elastomeric compound having a tensile elastic modulus at 10% elongation MA10 at least equal to 5 MPa and at most equal to 15 MPa, and wherein any metal reinforcer of a crown layer has a law governing its behaviour under compression that is characterized by a critical buckling strain E0 at least equal to 3%, said law governing behaviour under compression being determined on a test specimen made up of a reinforcer placed at its centre and coated with a parallelepipedal volume of an elastomeric compound having a tensile elastic modulus at 10% elongation MA10 at least equal to 5 MPa and at most equal to 15 MPa.

13. The tire according to claim 12, wherein any metal reinforcer of a crown layer is a multi-strand rope of structure 1×N comprising a single layer of N strands, each strand comprising an internal layer of M internal threads wound in a helix and an external layer of P external threads wound in a helix around the internal layer.

14. An assembly comprising:

a rim having a nominal diameter Dj; and a tire for an agricultural vehicle, mounted on the rim and inflated to a recommended minimum pressure at most equal to 240 kPa and a maximum pressure of at most 440 kPa, having an outside diameter D and comprising, radially from the outside to the inside, a tread, a crown reinforcement and a carcass reinforcement:

the tread comprising tread pattern elements that are separated from one another by circumferential and transverse voids and having a radial height H at least equal to 20 mm and at most equal to 50 mm, measured between a tread surface and a bearing surface parallel to the tread surface and tangential to the bottoms of the deepest voids, the tread, which has an axial width L, comprising at least two axially outer voids, each having a mean line that forms an angle at most equal to 45° with a circumferential direction (XX') of the tire, which are positioned on either side of an equatorial plane (XZ) passing through the middle of the tread and are spaced apart from one another by a mean axial distance L1 at least equal to 0.5*L, the tread having an overall volumetric void ratio TEV, defined as the ratio between the volume VC of voids and the total volume V of the tread assumed to be free of voids, comprised between the bearing surface and the tread surface, at least equal to 30% and at most equal to 60%, the crown reinforcement comprising at least two crown layers, each comprising metal reinforcers that are coated in an elastomer-based material, are mutually parallel, are crossed from one layer to the next and form an angle at least equal to 10° with the circumferential direction (XX') of the tire, the carcass reinforcement comprising one carcass layer comprising textile reinforcers that are coated in an elastomer-based material, are mutually parallel and form an angle at least equal to 75° and at most equal to 105° with the circumferential direction (XX') of the tire, wherein the carcass reinforcement is made up of a single carcass layer having a mean thickness E at most equal to 2 mm and a breaking strength Fr, expressed in daN/cm, that satisfies the relationship:

$$Fr>=Fs=(Cs*P\max*10^{-3})*((R^2-((R+Rj)/2)^2)/2)/Rj,$$

with

Fs: reference threshold strength (in daN/cm)

Cs: safety factor at least equal to 1,

Pmax: recommended maximum inflation pressure (in kPa),

R=D/2: outside radius of the tire (in mm),

Rj=Dj/2: nominal radius of the rim (in mm), wherein Cs*Pmax is at least 1000 kPa.

* * * * *